United States Patent [19]

Talbot et al.

[11] Patent Number: 4,649,457

[45] Date of Patent: Mar. 10, 1987

[54] SURGE PROTECTION DEVICE

[75] Inventors: Laurel C. Talbot; Wilbur T. Reed, both of Springfield, Mo.

[73] Assignee: B. H. Tytewadd Marketing, Incorporated, Springfield, Mo.

[21] Appl. No.: 783,785

[22] Filed: Oct. 3, 1985

Related U.S. Application Data

[63] Continuation of Ser. No. 581,065, Feb. 17, 1984, abandoned.

[51] Int. Cl.[4] .............................................. H02H 9/04
[52] U.S. Cl. .................................... 361/127; 361/117; 361/111
[58] Field of Search ................... 361/56, 91, 111, 117, 361/119, 126, 127

[56] References Cited

U.S. PATENT DOCUMENTS

| | | | |
|---|---|---|---|
| 3,992,652 | 11/1976 | Blaisdell et al. | 361/127 |
| 4,161,012 | 6/1979 | Cunningham | 361/128 |
| 4,259,705 | 3/1981 | Stifter | 361/56 |
| 4,262,317 | 4/1981 | Baumbach | 361/124 |
| 4,320,436 | 3/1982 | Bushnell | 361/128 |
| 4,345,290 | 7/1982 | Johnson | 361/56 |
| 4,389,695 | 6/1983 | Carpenter, Jr. | 361/55 |
| 4,439,807 | 3/1984 | Reitz | 361/127 |
| 4,456,942 | 6/1984 | Bronikowski | 361/127 |

*Primary Examiner*—A. D. Pellinen
*Attorney, Agent, or Firm*—Kokjer, Kircher, Bradley, Wharton, Bowman & Johnson

[57] ABSTRACT

A surge protection device for protecting an electric power system from excessive voltage surges, including those caused by direct lightning strikes. Metal oxide varistors are wired between each incoming 115 volt power line and ground and between the two power lines. The varistors connect with the power lines on the user side of the main circuit breakers. The varistors are normally nonconductive but become conductive when excessive voltages are present on the power lines. Then, short circuits are established through the varistors to protect downline equipment. The varistors are embedded in a pliable filler material which fills a rigid polymeric shell. In the event of a direct lightning strike, the surge protector is destroyed sacrificially and the pressure resulting from the failure is relieved through the opposite ends of the shell.

11 Claims, 3 Drawing Figures

DOWN LINE EQUIPMENT

SURGE PROTECTION DEVICE

This is a continuation of application Ser. No. 581,065, filed Feb. 17, 1984 now abandoned.

BACKGROUND AND SUMMARY OF THE INVENTION

This invention relates in general to the protection of electrical and telephone equipment from damage caused by excessive voltage surges. More particularly, the invention deals with a surge detector which protects entire electrical and telephone circuits from both ordinary surges and extreme voltage surges such as those caused by a direct lightning strike.

Surge protector and surge arrestors have long been used for the protection of electrical equipment from the erratic power surges or spikes that occur from time to time in electrical distribution systems. Each surge protector typically serves one electrical device which is deemed to be particularly important to protect, usually because of its expense or the severe problems that can result from the equipment being taken out of service. Ordinarily, the surge protector is wired in series with a fuse or circuit breaker and acts to absorb voltage spikes in order to prevent them from possibly damaging the equipment served by the protective device. The fuse of circuit breaker is relied upon to protect both the surge protector and the electrical equipment from overloads and other extreme conditions.

There are numerous problems with this conventional approach to the handling of voltage surges. Perhaps most importantly, it is recognized that conventional surge protectors are unable to effectively handle extreme transient voltage conditions such as those caused by a direct lightning strike to the power lines. Voltage of this magnitude are applied to the electrical equipment before the fuse or circuit breaker can operate to open the circuit, and destruction and other extreme damage to the equipment can result. Even in situations where the surge protector is effective, it is able to protect only the single appliance which it serves, and other appliances and the electrical system in general remain unprotected It is thus apparent that there is a need for an electrical surge protector which acts to protect entire electrical systems and telephone systems and all appliances they serve from ordinary voltage spikes and also from the destructive effects caused by extreme transient conditions such as the surge voltages resulting from direct lightning hits. It is the primary goal of our invention to meet that need. To our knowledge, there have been no surge protectors available in the past capable of handling extreme voltage conditions, and there have likewise been no surge protectors available for the protection of the entire power or telephone systems of a residence, small business or light commercial establishment.

In accordance with our invention, metal oxide varistors serve to protect electrical systems and telephone circuits from voltage surges. The varistors are housed in a rigid polymeric shell which is mounted within the fire rated fuse box or circuit breaker box already present in the building served by the surge protector. The varistors are connected with the incoming power lines or telephone lines on the user side of the main circuit breakers or fuses. Connection of the surge protector with the electrical or telephone system is simple, and all connections are located within the enclosed fuse box or circuit breaker box.

The varistors are nonconductive when normal voltages are applied to the electrical or telephone circuit to provide power to the downline electrical or telephone equipment. However, when voltage spikes occur at levels above normal voltage levels, the varistors become immediately conductive and establish short circuits which divert the spikes from the downline equipment. In the event of extreme voltage levels such as those caused by lightning striking the power or telephone lines, the varistors accept all of the incoming power in the short circuit mode in order to protect the downline equipment long enough to permit the fuse or circuit breaker to open the circuit. The application of extreme voltages to the varistors causes them to fail sacrificially but only after they have functioned long enough to open the fuse or circuit breaker in order to protect the electrical or telephone equipment from destructive effects of the extreme voltage. The construction of the shell and the embedding of the varistors and related components in a pliable, nonflammable filler material within the shell minimizes the potential hazards resulting from catastrophic failure of the surge protector in extreme conditions.

DETAILED DESCRIPTION OF THE INVENTION

In the accompanying drawing which forms a part of the specification and is to be read in conjunction therewith and in which like reference numerals are used to indicate like parts in the various views.

Figure 1:
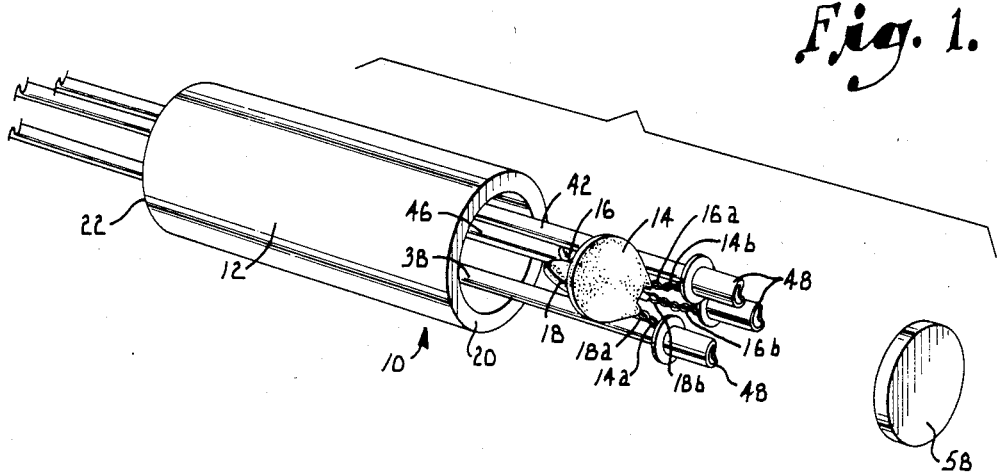
FIG. 1 is an exploded perspective view of a surge protection device constructed according to a preferred embodiment of the present invention.

Referring now to the drawing in more detail, numeral 10 generally designates a surge protection device constructed in accordance with the present invention. The surge protection device 10 has a rigid plastic shell 12 which forms a housing for three varistors 14, 16 and 18 which serve as the functional components of the surge protector. The shell 12 has a tubular wall and initially open opposite ends 20 and 22. The shell 21 can be constructed of any suitable fire rated material and is preferably formed from rigid pvc pipe.

Figure 3:
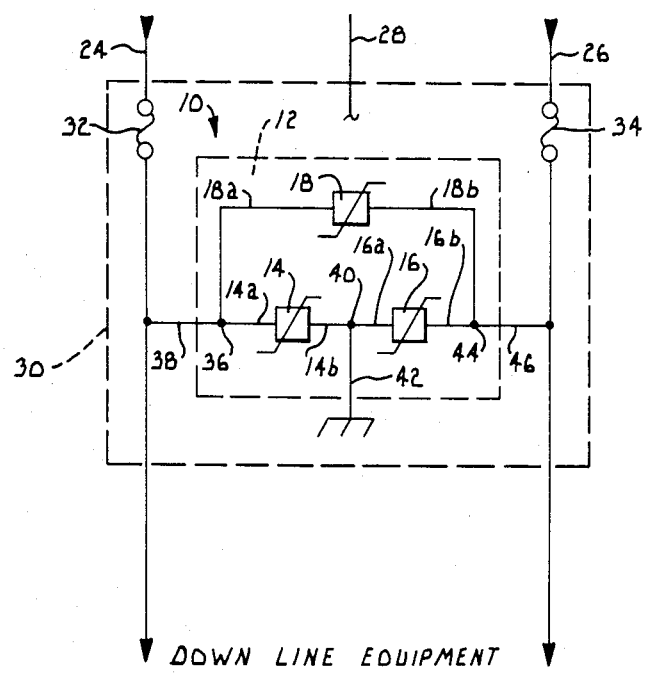
FIG. 3 is a schematic diagram showing the manner in which the surge protection device is connected to the incoming power lines of an electrical system.

The surge protection device 10 is intended for use in residential, small business and light commercial power systems and incoming telephone lines, and it is connected with the power system or telephone lines on the user side of the incoming fuses or circuit breakers. FIG. 3 illustrates schematically the manner in which the surge protector is electrically connected with the incoming power lines of a typical three wire electrical distribution system.

The electrical system includes a pair of incoming 115 volt power lines 24 and 26 and a neutral line 28. All of the incoming lines extend into an enclosed metal fuse box or circuit breaker box 30 which forms an enclosure for the electrical service distribution panel of the residence, small business or commercial establishment. The incoming hot lines 24 and 26 are provided with respective main circuit breakers 32 and 34 (or fuses) which serve as overload protectors and which likewise open the power circuits if a short circuit develops. The circuit breakers 32 and 34 are mounted within the box 30. Downline from the circuit breakers 32 and 34, the power lines 24 and 26 connect with branch circuits which service downline electrical equipment (not shown).

As previously indicated, the varistors 14, 16 and 18 are contained within the shell 12, and the shell is mounted within the box 30. Varistor 14 has lead wires 14a and 14b connecting with its opposite sides. Wire 14a has an electrical connection 36 with a lead wire 18a leading from one side of varistor 18. Extending from connection 36 to line 24 is a conductor 38 which connects with line 24 within the box 30 at a location between circuit breaker 32 and the downline equipment served by line 24. The other lead wire 14b connects at junction 40 with a lead wire 16a extending from one side of varistor 16. Extending from the connection 40 is a conductor 42 which is connected at its opposite end with the neutral line 28 or with ground potential. The other two varistor leads 16b and 18b are connected at juncture 44 from which another conductor 46 extends to connection with power line 26. The connection between conductor 46 and power line 26 is located within the box 30 between the circuit breaker 24 and the downline equipment served by line 26.

Figure 2:
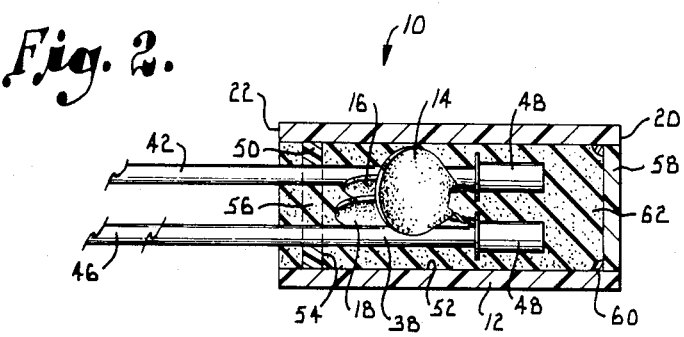
FIG. 2 is a sectional view showing the surge protection device in its assembled form.

The wire connections 36, 40 and 44 are all soldered connections. Additionally, as shown in FIGS. 1 and 2, each of these wire connections is enclosed by a metal wire connector 48 which is crimped tightly on the connection. The soldered nature of the wire connections and the use of the mechanically crimped connectors 48 enhances the security of the wire connections and assures that they will not inadvertently fail.

As shown in FIG. 2, a retainer ring 50 projects inwardly from the tubular wall of shell 12 into the cylinder chamber 52 presented within the shell for housing of the varistors and related components. Ring 50 is located near end 22 of the shell and may be secured to the shell wall by glue or in any other suitable manner. The ring 50 presents an annular shoulder 54 which faces the opposite end 20 of the shell. A circular passage 56 is formed through the ring 50 in order to accommodate the conductor wires 38, 42 and 46 which are insulated wires. The wires extend through end 22 of the shell and through passage 56 into the crimped wire connectors 48.

The opposite end 20 of the shell is covered by a discoidal end plug or cap 58. Preferably, the end cap 58 is connected with the interior surface of the shell wall by a bead of glue 60 which holds the end cap in place covering the end 20. The end cap prevents a screw driver or similar device from being extended into the shell to possibly create an electrical shock hazard. The glued connection 60 between the end cap and shell wall is intentionally a relatively weak connection so that it will fail and release the end cap 58 in the event of excessive pressure build up within the shell. The end cap 58 is then displaced from the end of the shell in order to relieve the pressure within chamber 52 before the pressure level rises sufficiently to fracture the shell wall.

The wire connections 36, 40 and 44 are located between the varistors and the end cap 58, as are portions of the insulated wires 38, 42 and 46. The retainer ring 50 and particularly the annular shoulder surface 54 serves to retain the varistors and related components within the shell when a pulling force is applied to any of the wires 38, 42 or 46. The varistors are restricted from moving through the passage 56 when the wires are subjected to a pulling force applied within the limits specified by prevailing standards established by recognized testing organizations.

The varistors, electrical connectors 48, lead wires and portions of the insulated wires 38, 42 and 46 are all embedded in a pliable filler material 62 which fills the chamber 52 formed within shell 12. The filler material is nonflammable and may conveniently be silicon rubber of a similar pliable substance treated with a suitable flame retardant. The pliable character of the filler material assists in the absorption of the extreme energy generated when the surge protection device 10 is destroyed sacrificially, while its nonflammable nature reduces the fire hazard.

In use, the surge protector 10 protects the downline equipment on the power lines 24 and 26 (or incoming telephone lines) from damage caused by voltage surges. The surge protector is connected with the power system in the manner shown in FIG. 3, and the varistors 14, 16 and 18 are nonconductive at the voltage levels normally applied to lines 24 and 26 for operation of the downline appliance and equipment. However, when a voltage spike appears on the power system at sufficient magnitude, the varistor to which the voltage is applied becomes conductive and establishes a short circuit. For example, if a voltage spike appears on line 24 at sufficient magnitude to make varistor 14 conductive, a short circuit is established from line 24 through line 38, connection 36, lead wire 14a, varistor 14, lead wire 14b, connection 40 and line 42. This short circuit prevents the voltage spike from affecting the downline equipment. Varistor 14 reverts to the conductive state as soon as the voltage spike passes. Normally, the short circuit will not be established long enough to cause the circuit breaker 32 to open.

Similarly, application of a voltage spike to the other power line 26 makes varistor 16 conductive and establishes a short circuit which protects the downline equipment served by line 26. When the potential between lines 24 and 26 is sufficient to make the third varistor 18 conductive, it establishes a short circuit between the two power lines and thus protects downline equipment served by 230 volt power.

In the event that lightning directly strikes the power transmission lines to cause extreme transient conditions on lines 24 and 26, the varistors are able to draw all of the transient power through the short circuits they establish and to maintain the short circuits through the varistors for a sufficient time to permit the circuit breakers 32 and 34 to open. Thus, prior to opening of the circuit breakers, the varistors prevent the extreme voltage condition on the power lines from damaging the downline equipment, and the circuit breakers protect the equipment once they have opened.

Application of extremely high voltages such as caused by direct lightning strikes to the varistors causes the varistors to be subjected to extreme forces which result in sacrificial failue of the surge protector 10. The extreme power levels applied to the varistors mechanically rupture the varistors and create explosive forces within the shell 12. The forces are absorbed partially by the pliable filler material 62 which fills shell 12. The filler material presses against the end cap 58 and causes the glued connection 60 to fail, thereby releasing the end cap and relieving the pressure generated internally of the shell by the destruction of the varistors. Release of the pressure in this fashion normally prevents the wall of shell 12 from fracturing.

Additionally, since the electrical connections covered by connector 48 are located between the sacrificial varistors and the end cap 58, the pressure is applied to the lead wires of the varistors and the wires 38, 42 and 46, causing elongation of the wires which partially absorbs the energy released during rupture of the surge protection package. The wires are stretched until they snap or the pressure subsides, whichever occurs first. The result is either a reduction in the force resulting from destruction of the package or prevention of the end cap 58 from releasing in some cases.

Since the pressure resulting from destruction of the varistors is relieved through both ends of the shell 12, the shell wall normally does not fracture but instead only the end cap 58 and the soft filler material 62 is forced out of the shell. The filler material is soft enough to prevent significant damage, and the small end plug 58 is confined to the enclosed circuit breaker box 30 in which the device is contained so that damage to surrounding objects is minimized. Additionally, fire hazards are minimized because of the nonflammable nature of all components of the surge protector and its enclosure within the fire rated circuit breaker box.

It should be noted that the surge protector is equally suited for use in a two wire electrical system and also in connection with incoming telephone lines. In either of these cases, the surge protector would include only a single varistor connected on one side with the incoming power line or telephone line on the user side of the circuit breaker. The other side of the varistor would be connected to effect a short circuit in the event of a voltage surge at a level sufficient to make the varistor conductive, thereby protecting the downline electrical or telephone equipment. In the case of telephone lines, the increasing use of computers and other sophisticated and expensive electronic equipment directly on the telephone network makes it increasingly important to provide the telephone system with protection such as that afforded by our surge protector.

It should also be noted that the surge protector can be used in a three phase power system and will be connected for each phase in substantially the same manner desribed herein.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, we claim:

1. In a wiring complex such as an electrical power system or telephone system having an incoming conductor line equipped with an overload protector and equipment on the incoming conductor line at a location downline from the overload protector, a surge protection device comprising:

a normally interrupted electrical shunt circuit connected with said incoming conductor line at a location thereon between the overload protector and the downline equipment, said shunt circuit having a completed condition establishing a short circuit path for power on the incoming line;

a varistor in said electric shunt circuit having a nonconductive state at voltages below a preselected voltage level corresponding to surge voltages applied to the incoming line to normally effect interruption of said electric shunt circuit to permit application of power to the downline equipment, said varistor having a conductive state at voltages above said preselected level to complete said shunt circuit and establish said short circuit path immediately upon application of surge voltages to the incoming line, said varistor maintaining said short circuit path for a sufficient time to activate the overload protector, thereby preventing application of surge voltages to the downline equipment, a nonflammable shell presenting a substantially enclosed chamber therein containing said varistor and at least a portion of said electric shunt circuit, said shell having a first end;

a pliable nonflammable filler material substantially filling said enclosed chamber, said varistor and portion of the shunt circuit being embedded in said filler material;

an end cap secured on said first end of the shell in an intentionally weakened manner to effect displacement of the end cap from said shell in the event of excessive pressure generated internally of the shell;

a plurality of wires in said portion of the shunt circuit and a plurality of connections between said wires, each of said connections being soldered and each being between said varistor and said first end of the shell; and a metal wire connector on each connection mechanically crimped on the wires leading to each connection, whereby excessive energy generated internally of the shell is partially absorbed by the wires.

2. The device of claim 1, wherein said shell is generally tubular and includes an annular shoulder projecting into said enclosed chamber from the shell at a location wherein said varistor is between said shoulder and said first end of the shell, said wires extending into the shell from a second end thereof opposite said first end and extending through an opening defined within said shoulder, said shoulder retaining said varistor and wire connectors against passage through said opening when a pulling force is applied to the wires.

3. In an electric power system having electrically powered downline equipment potentially exposed to excessive surge voltages applied to an imcoming power line equipped with an overload protector contained in a fire rated enclosure, a surge protection device comprising:

a rigid nonflammable shell presenting a chamber therein, said shell being located in said fire rated enclosure and having a tubular wall and opposite ends through which pressure generated in said chamber is relieved;

an end cap covering one end of the shell and being secured therein in a manner to fail and release therefrom before the wall of the shell fractures due to pressure generated in said chamber;

a normally interrupted electric shunt circuit having a completed condition establishing a short circuit path through the overload protector but not through the downline equipment, thereby operating the overload protector when said short circuit path is maintained for a predetermined time sufficient to operate same;

a varistor located in said chamber and included in said electrical shunt circuit to normally maintain the circuit in an interrupted condition when normal voltages below a preselected level are applied to the incoming line to maintain the varistor in a nonconductive state, said varistor being conductive to establish said short circuit path at voltages above said preselected level and said varistor maintaining its conductive state to maintain the short circuit path for said predetermined time when surge voltage is maintained on the incoming line for said predetermined time, whereby substantially all current is drawn through said short circuit path to protect the downline equipment from transient surge voltages;

a plurality of wires included in said electric shunt circuit, said wires extending through one end of said shell and having plural connections with said varistor, each connection being a soldered connection located between said varistor and said end cap and each soldered connection being enclosed by a metal wire connector mechanically crimped thereon; and a pliable nonflammable filler material substantially filling said chamber and embedding said varistor, whereby said filler material assists in absorbing energy when the varistor fail sacrificially upon application of extreme voltages such as caused by lightening at a level to effect destruction of the varistor.

4. In an electrical service distribution panel enclosure having first and second incoming power lines and a neutral line applying electrical power for operating electrical equipment downline from the service panel and an overload protector in the enclosure for each power line, a surge protection device comprising:

a rigid nonflammable shell presenting an enclosed chamber therein, said shell being located within the enclosure in close physical proximity to both overload protectors;

a first varistor having opposite sides, one side connected with ground potential and the other side connected with the first power line at a location within the enclosure in close physical proximity to the overload protector for the first power line and between the overload protector and the downline equipment served by the first power line, thereby establishing a short circuit between the first power line and ground potential when said first varistor is conductive;

a second varistor having opposite sides, one side connected with ground potential and the other side connected with the second power line at a location within the enclosure in close physical proximity to the overload protector for the second power line and between the overload protector and the downline equipment served by the second power line, thereby establishing a short circuit between the second power line and ground potential when the second varistor is conductive;

a third varistor having opposite sides connected with the respective first and second power lines at locations within the enclosure in close physical proximity to the overload protectors and between the overload protectors and the downline equipment at a location between the overload protctors and the downline equipment when the third varistor is conductive;

said varistors all being contained in said chamber within the shell and each having a nonconductive state at normal voltage levels for the power lines and a conductive state at a preselected elevated voltage level corresponding to surge voltages on the lines, whereby surge voltages applied to either power line or between the power lines effect said short circuits to activate the overload protectors and protect the downline equipment; and a pliable nonflammable filler material substantially filling said chamber and embedding all of said varistors.

5. The device of claim 4, wherein each varistor is operable to maintain its conductive state for sufficient time to permit operation of the overload protector in response to the short circuit established for the power line to which the varistor is connected.

6. The device of claim 4, wherein said shell has a tubular wall and opposite ends for relieving pressure in said chamber to avert fracturing of said wall when the varistors fail sacrificially upon application of high level voltage thereto such as caused by a lightning strike to the power lines.

7. The device of claim 6, including an end cap on one end of said shell and means for establishing a connection of said end cap to the shell which is subject to failure to thereby to release said cap from the shell before the shell wall fractures.

8. The device of claim 6, including:
wiring for said varistors extending through one end of the shell; and
a retainer ring projecting into said chamber from the shell wall at a location between the varistors and said one end of the shell, said ring presenting a passage therethrough for accommodating the wiring and presenting an annular shoulder surface restricting said varistors from being pulled through said passage upon application of a pulling force to the wiring.

9. The device of claim 8 including an end cap covering the end of said shell opposite said one end thereof and means for establishing a connection between the end cap and shell which is subject to failure to thereby release the cap before the shell wall fractures.

10. The device of claim 9, including a plurality of wire connections between said wiring and said varistors, each connection being located between the varistors and said end cap to effect absorption of energy by the wiring adjacent each wire connection when the varistors fail sacrificially.

11. The device of claim 10, wherein each wire connection is a soldered connection enclosed by a metal wire connector mechanically crimped on the wire connection.

* * * * *